(12) United States Patent
Scheuer et al.

(10) Patent No.: US 6,407,467 B1
(45) Date of Patent: Jun. 18, 2002

(54) BUILT-IN APPLIANCE INTENDED FOR A MOTOR VEHICLE

(75) Inventors: Wilfried Scheuer, Gladenbach; Stephen Lauth, Asslar, both of (DE)

(73) Assignee: Mannesmann VDO AG, Frankfurt/Main (DE)

( * ) Notice: Subject to any disclaimer, the term of this patent is extended or adjusted under 35 U.S.C. 154(b) by 0 days.

(21) Appl. No.: 09/562,232

(22) Filed: Apr. 28, 2000

(30) Foreign Application Priority Data

Apr. 30, 1999 (DE) .......................................... 199 19 970
Aug. 6, 1999 (DE) .......................................... 199 36 712

(51) Int. Cl.⁷ .................................................. H04B 1/08
(52) U.S. Cl. ...................................... 307/10.1; 455/345
(58) Field of Search ............................. 307/10.1, 10.2, 307/66; 361/640, 679, 733, 351, 747; 455/349, 348, 345

(56) References Cited

U.S. PATENT DOCUMENTS 4,940,414 A * 7/1990 Lee ............................ 439/131
5,185,804 A * 2/1993 Watanabe ..................... 381/86
5,312,263 A   5/1994 Zapalski et al.
5,610,376 A * 3/1997 Takagi et al. ............. 200/50.01
6,131,051 A * 10/2000 Beckert et al. ............... 700/83

FOREIGN PATENT DOCUMENTS

| | | |
|---|---|---|
| DE | 3624716 | 2/1988 |
| DE | 4334565 | 4/1995 |
| EP | 0253947 | 1/1988 |
| EP | 0566128 | 10/1993 |
| WO | 9725222 | 7/1997 |

* cited by examiner

*Primary Examiner*—Rajnikant B. Patel
(74) *Attorney, Agent, or Firm*—Mayer, Brown, Rowe & Maw

(57) ABSTRACT

A built-in appliance for a motor vehicle car radio comprising an operating front that is connected releasably to the built-in appliance by a catch connection. The operating front is preferably designed as a switching rocker and thus, when an operating element of the operating front is actuated by pressing, makes it possible for the actuating force to be transmitted to a switching point arranged on the built-in appliance. There is therefore no need for electric contacting of the operating front, so that possible damage to the operating front is largely ruled out because electric contact points are dispensed with.

19 Claims, 2 Drawing Sheets

BUILT-IN APPLIANCE INTENDED FOR A MOTOR VEHICLE

FIELD OF THE INVENTION

The invention relates generally to built-in appliances, and in particular a motor vehicle car radio with an operating front capable of being removed for protection against unauthorized operation.

BACKGROUND OF THE INVENTION

Removable built-in appliances are often used on modern motor vehicles and are therefore known. In order to prevent possible theft, a built-in appliance is sometimes equipped with a removable operating front which can be carried around. Without the connected operating front, operation is ruled out, so that the built-in appliance essentially loses its value. The absence of the operating front may additionally be indicated by a conspicuous warning light visible even from outside, so that a potential thief is effectively deterred from theft.

One disadvantage that has become clear in such built-in appliances is that the removable operating front is exposed to increased wear, particularly during frequent use. In this case, in particular, the sensitive electric contact points on the operating front are damaged or are soiled to such an extent that it becomes necessary to attend to the operating front regularly. The removed operating front is often not treated with the necessary care. In particular, if the operating front falls down, this results, during operation, in restricted reliability of the operating elements arranged on the operating front, with loose electric contacts being a frequent nuisance.

Therefore, there is a need for a removable built-in appliance where the reliability of the built-in appliance is not restricted even when the operating front is removed frequently. There is also a further need for a removable built-in appliance where the risk of damage to the operating front due to improper handling is reduced.

Other needs will become apparent upon a further reading of the description, taken in conjunction with the drawings.

SUMMARY OF THE INVENTION

The aforementioned needs are addressed, according to the present invention, in that an operating front for a built in appliance is designed for transmitting a mechanical actuating force to a switching point arranged on the built-in appliance. Electrical contacting of the operating front can thereby be dispensed with. Operating faults attributable to improper handling are therefore largely ruled out. At the same time, the operating front is consequently insensitive to environmental influences, for example moisture. Furthermore, the operating front can be given reduced outer dimensions because rear contact points can be avoided. Furthermore, the transmission of the mechanical actuating force to the switching point can take place both directly, for example by means of a switching mat, and indirectly, for example by means of a voltage induced contactlessly at the switching point.

The operating front may have, on its rear side facing the built-in appliance, movably guided projections which engage with corresponding contact points of the built-in appliance and thus act on the switching point. By contrast, a particularly advantageous embodiment of the invention is afforded in that the operating front is mounted movably for the purpose of transmitting the actuating force. Movable structural elements on the operating front can thereby be dispensed with, since, for actuation, the operating front is moved as a whole. In this case, in particular, guides on the operating front for actuating buttons are dispensed with, so that possible damage to a movement mechanism of the operating front is ruled out.

In this respect, it is particularly beneficial if the operating front is designed as a switching rocker. Simple force transmission can be achieved as a result, the switching rocker being formed essentially by a single component. At the same time, jamming of the operating front due to careless positioning is largely ruled out. For this purpose, the operating front is provided, for example, with recesses, by means of which the operating front engages into projections arranged on the built-in appliance.

Another particularly advantageous embodiment of the invention is also afforded in that the operating front is designed for transmitting the mechanical actuating force to a tappet connected to the switching point. It thereby becomes possible to equip the operating front with a multiplicity of actuating faces which in each case act by means of the tappet on their own switching point. Different functions can therefore by combined in an expedient way on the operating front and operating thus made easier.

Another particularly advantageous development of the invention is also afforded when the operating front has a receptacle designed for the positive insertion of the tappet. For this purpose, the receptacle has dimensions which are coordinated with the tappet and thus rule out the use of another operating front. The possibility of starting operation is therefore restricted to the original operating front, so that the value of the built-in appliance without the operating front to a potential thief is reduced considerably.

It is particularly useful, at the same time, if the operating front has a coding. The operation of the built-in appliance is thereby additionally dependent on the coding which, for this purpose, is determined, for example, by a magnetic field which is specific to the appliance and can be identified by a corresponding sensor of the built-in appliance.

A particularly advantageous refinement of the invention is also afforded in that the operating front is capable of being illuminated. As a result, it becomes possible for the built-in appliance to be operated without difficulty, even if there is insufficient light in the surroundings. In this case, illumination takes place, for example, by means of background illumination of a symbol or of another character assigned to the functioning of the operating front.

For this purpose, the operating front may have a contact point for supplying electric power to a light source arranged on the operating front. By contrast, a particularly simple embodiment of the invention is afforded in that the operating front has a light input point, connected to a light guide, for illumination by means of a light source arranged on the built-in appliance. As a result, electric contacting of the operating front can be dispensed with completely and the light source present on the built-in unit can be used at the same time for illuminating the operating front. For this purpose, the light input point may be integrated, for example, into a bearing point of the operating front in this case arranged movably, whilst, at the same time, sufficient light input can be achieved, irrespective of the actuating position of the operating front.

A particularly advantageous embodiment of the invention is achieved in that the operating front is fixed in its position by means of a manually actuable catch connection. As a result, on the one hand, the operating front can be fixed quickly and easily in its position of use and, on the other hand, it is necessary merely to actuate the catch connection in order to remove the operating front. For this purpose, the catch connection may have, for example, a displaceable bolt that is movable against the return force of a spring and is capable of being triggered by means of pressing or sliding actuation.

A particularly beneficial development of the invention is afforded in that the built-in appliance has a guide making it easier to position the operating front, the operating front having recesses and the built-in appliance having projections engaging into the latter. It thereby becomes considerably easier to handle the operating front. In particular, the guide may have a bevel or a chamfer, by means of which the operating front is guided into the correct position. For fixing, the operating front can be laid against the built-in appliance merely on one side and subsequently be fixed by means of a pivoting movement, during which the guide at the same time prevents it from possibly sliding off.

DETAILED DESCRIPTION

Figure 1:
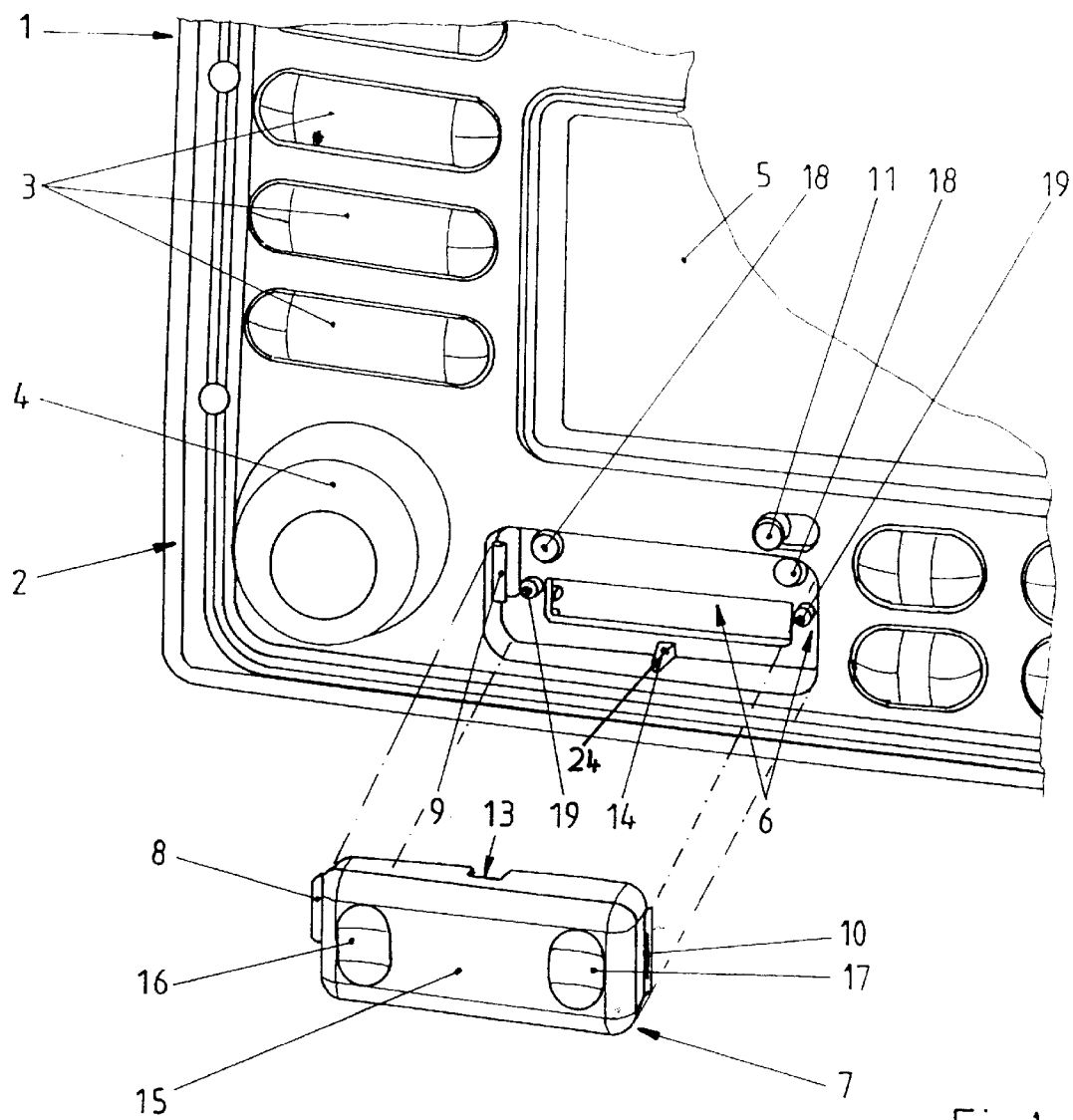
FIG. 1 shows a front perspective view of a built-in appliance and of an operating front according to the invention.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated and described herein.

FIG. 1 shows a perspective view of a built-in appliance 1 designed as a car radio. The built-in appliance 1 has a front side 2, with a plurality of actuating elements 3, and also a rotary switch 4 and a display 5. The built-in appliance 1 has, furthermore, a introduction orifice 6 for introducing a storage card which is not illustrated. This introduction orifice 6 is at the same time closed by an operating front 7 when the latter is inserted. For this purpose, the operating front 7 has a projection 8 which, for fixing the operating front 7, first engages behind a catch nose 9 of the built-in appliance 1. Subsequently, a catch face 10 located opposite the projection 8 is fixed. For this purpose, a catch means, not illustrated, which is connected to an actuating element 11, designed as a slide, engages in the catch face 10. The catch face 10 and the catch means, not illustrated, together form a catch connection, not illustrated.

The operating front 7 contains two recesses 13, which are designed as a pivoting faces and into which two wedge-shaped projections 14 of the built-in appliance 1 engage. This structure supports the operating front 7 in the form of a rocker in the built-in appliance 1.

Connected in one piece to the operating front 7 is an operating element 15 having two ergonomically shaped pressure faces 16, 17. Pressing actuation of the pressure face 16, 17 is transmitted in each case to a switching point 18 of the built-in appliance 1 by means of the operating front 7 designed for this purpose as a rocker button. In this case, the operating front 7 is pivoted about a bearing face between a front ends 24 of the wedge-shaped projections 14 and a semicircular rear end 25 of recesses 13 illustrated in more detail in FIG. 2.

During the actuation of the operating front 7, electric contacting takes place solely inside the built-in appliance 1, so that an operating fault can be prevented, such as a short circuit within the operating front 7 due to improper handling. Furthermore, two contact pins 19 also allow direct electric contacting of the operating front 7, with the built-in appliance 1, for example in order to supply electric power to a light source illustrated in FIG. 3 or other secondary functions.

Figure 2:
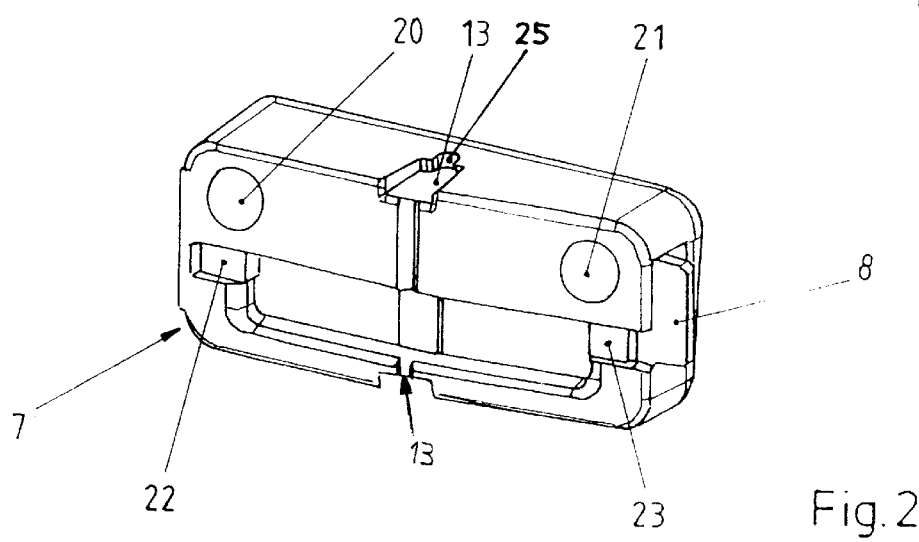
FIG. 2 shows a rear perspective view of the operating front shown in FIG. 1.

FIG. 2 shows an enlarged perspective illustration of the rear side of the operating front 7 shown in FIG. 1. The projection 8 and the recesses 13, which, for fixing the operating front 7, have a wedge shape making the pivoting movement easier, can be seen. Moreover, the operating front 7 has two receptacles 20, 21, into which, in the operating state, in each case one of the switching points 18 shown in FIG. 1 engages with a tappet and thus allows the actuating force to be transmitted. The operating front 7 has, furthermore, two contact faces 22, 23 for the contact pins 19 shown in FIG. 1. As a result of the electric contacting to be achieved in this way, it is at the same time possible, for example, to provide the operating front 7 with an individual coding, as described above, in order reliably to rule out the operation of the built-in appliance 1 without the associated operating front 7 and thus to achieve even further improved theft protection for the built-in appliance 1.

Figure 3:
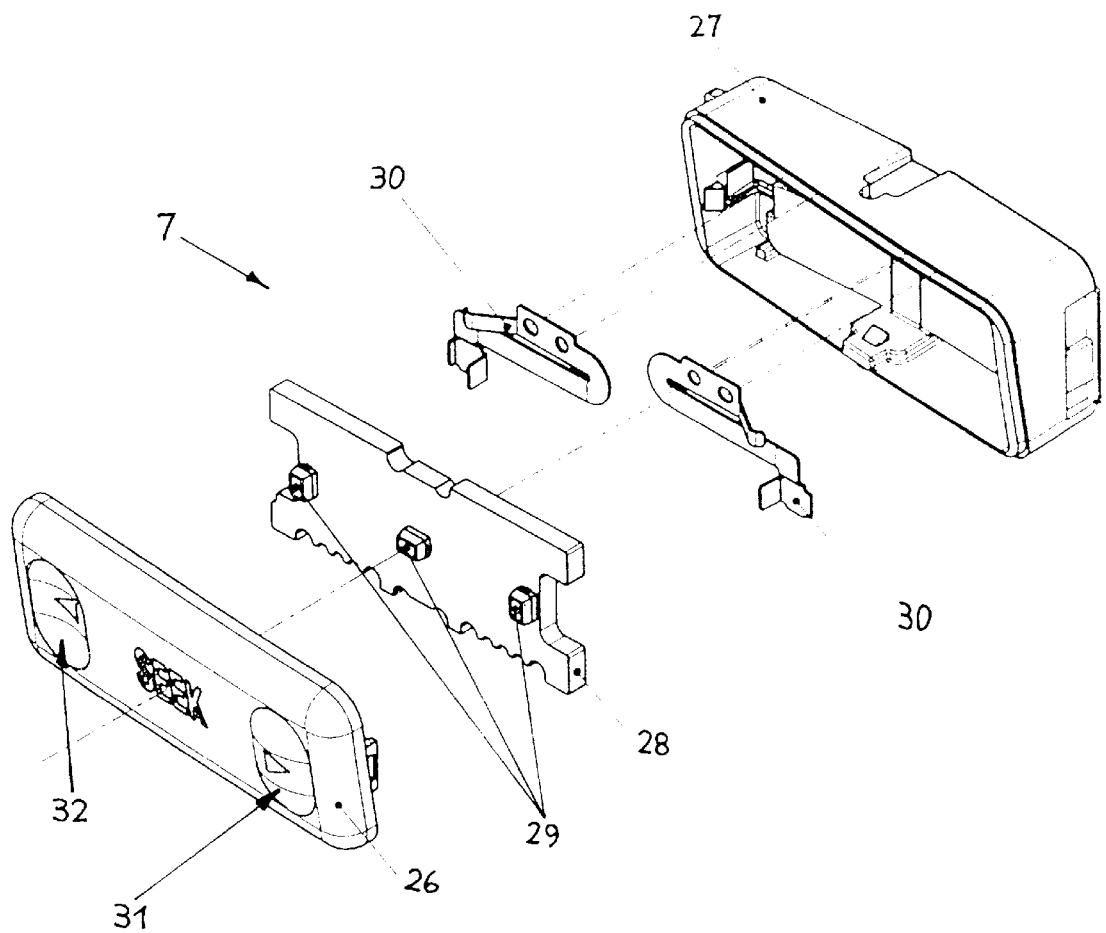
FIG. 3 shows an exploded view of the operating front.

FIG. 3 shows an exploded illustration of the operating front 7. A forwardly open housing 27 of the operating front 7 receives a circuit board 28 provided with three light sources 29. For the electric contacting of the light sources 29 arranged on the circuit board 28 and designed as LEDs, contact springs 30 are provided, which connect the circuit board 28 to the two contact faces 22, 23 (FIG. 2) of the operating front 7. On its front side facing an operator, the housing 27 is closed by means of a panel 26, the panel 26 being snapped into the housing 27. As may be gathered from the inscription "SEEK" on the panel 26, the operating front 7, for example, may serve for actuating a transmitter search function of the built-in appliance 1 designed as a car radio. Furthermore, along with a touch-contact face 31 for an upward search function and a touch-contact face 32, located opposite this touch-contact face 31, for a downward search function, the panel 26 has the pressure faces 16, 17 (FIG. 1). In order to make it simpler to operate the built-in appliance 1 when the surroundings are dark, the touch-contact faces 31, 32 and the inscription "SEEK" on the panel 26 are capable of being illuminated with the aid of the light sources 29.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed:

1. A built-in appliance for a motor vehicle comprising an operating front capable of being removed for protection against unauthorized operation, wherein the operating front is mounted movably to the built-in appliance for transmitting a mechanical actuating force to a switching point arranged on the built-in appliance.

2. The built-in appliance as claimed in claim 1, wherein the operating front is designed as a switching rocker.

3. The built-in appliance as claimed in claim 1, wherein the operating front is designed for transmitting the mechanical actuating force to a tappet connected to the switching point.

4. The built-in appliance as claimed in claim 1, wherein the operating front has a receptacle designed for the positive insertion of the tappet.

5. The built-in appliance as claimed in claim 1, wherein the operating front ha s a coding.

6. The built-in appliance as claimed in claim 1, wherein the operating front is capable of being illuminated.

7. The built-in appliance as claimed in claim 1, wherein the operating front has a light input point, connected to a light guide, for illumination by means of a light source arranged on the built-in appliance.

8. The built-in appliance as claimed in claim 1, wherein the operating front is fixed in its position by a manually actuable catch connection.

9. The built-in appliance as claimed in claim 1, wherein the operating front further comprises at least one recess and the built-in appliance further comprises at least one projection that is engageable with the recess.

10. An appliance for a vehicle, comprising:
    a first portion of said appliance, wherein said first portion is fixedly attached to said vehicle;
    a second portion of said appliance mounted movably to said first portion, wherein said second portion actuates a switching point on said first portion and said second portion is capable of being removed from said first portion of said appliance.

11. The appliance as claimed in claim 10, wherein said operating front is movably mounted in the configuration of a rocker switch.

12. The appliance as claimed in claim 10, wherein said second portion further comprises a coding and said first portion further comprises a coding sensor.

13. The appliance as claimed in claim 10, wherein said second portion contains a light source.

14. The appliance as claimed in claim 13, wherein said light source is at least one LED.

15. The appliance as claimed in claim 10, wherein said first portion contains a light source that illuminates at least one area of said second portion.

16. The appliance as claimed in claim 10, wherein said second portion actuates a tappet connected to said switching point.

17. An appliance for a vehicle, comprising:
    a first portion of said appliance, wherein said first portion is fixedly attached to said vehicle;
    a second portion of said appliance mounted movably to said first portion, wherein said second portion actuates a switching point on said first portion, wherein said second portion is in the configuration of a rocker switch and wherein said second portion is capable of being removed from said first portion of said appliance.

18. The appliance as claimed in claim 17, wherein said second portion actuates said switching point through a tappet connected to said switching point, and wherein said second portion contains a receptacle that allows for the positive insertion of said tappet.

19. The appliance as claimed in claim 18, wherein said second portion further comprises a coding and said first portion comprises a coding sensor, and wherein said second portion contains a light source.

* * * * *